United States Patent
Lin et al.

(10) Patent No.: US 7,106,672 B1
(45) Date of Patent: Sep. 12, 2006

(54) METHOD AND APPARATUS FOR USING A FREQUENCY DIFFERENCE TO ADJUST A TARGET BIT FOR BIT COUNTING

(75) Inventors: Xiao Lin, San Jose, CA (US); Long Nguyen, Saratoga, CA (US)

(73) Assignee: Zoran Corporation, Sunnyvale, CA (US)

( * ) Notice: Subject to any disclaimer, the term of this patent is extended or adjusted under 35 U.S.C. 154(b) by 682 days.

(21) Appl. No.: 09/953,748

(22) Filed: Sep. 11, 2001

(51) Int. Cl.
*G11B 7/00* (2006.01)
*H03K 21/00* (2006.01)

(52) U.S. Cl. ............ 369/47.48; 369/47.3; 369/53.34; 377/33

(58) Field of Classification Search ........ 369/53.34, 369/47.48, 47.35, 47.3; 377/33
See application file for complete search history.

(56) References Cited

U.S. PATENT DOCUMENTS

| | | | | |
|---|---|---|---|---|
| 3,922,613 A | * | 11/1975 | Allen et al. ............ 375/360 |
| 4,261,054 A | * | 4/1981 | Scharla-Nielsen ......... 455/13.4 |
| 4,707,805 A | * | 11/1987 | Narusawa et al. ............ 360/32 |
| 4,727,530 A | * | 2/1988 | Tomisawa ................ 369/47.45 |
| 4,996,698 A | * | 2/1991 | Nelson ...................... 375/372 |
| 5,218,491 A | * | 6/1993 | Nishida et al. .......... 360/73.03 |
| 5,710,595 A | * | 1/1998 | Hang et al. ............ 375/240.05 |
| 5,850,574 A | * | 12/1998 | Takita ........................ 710/69 |
| 6,169,973 B1 | | 1/2001 | Tsutsui et al. |
| 6,195,321 B1 | * | 2/2001 | Takamine et al. ........ 369/47.44 |
| 6,198,707 B1 | * | 3/2001 | Yamamoto ............... 369/47.25 |
| 6,275,544 B1 | * | 8/2001 | Aiello et al. ................ 375/326 |
| 6,356,520 B1 | * | 3/2002 | Hanamoto et al. ........ 369/47.1 |
| 6,476,996 B1 | * | 11/2002 | Ryan .......................... 360/75 |
| 6,483,793 B1 | * | 11/2002 | Kim ........................ 369/59.22 |
| 6,661,752 B1 | * | 12/2003 | Eom ......................... 369/47.1 |
| 6,704,387 B1 | * | 3/2004 | Lin .............................. 377/33 |

* cited by examiner

*Primary Examiner*—Gautam R. Patel
(74) *Attorney, Agent, or Firm*—Blakely, Sokoloff, Taylor & Zafman LLP; Judith A. Szepesi (57) ABSTRACT

A method and apparatus for normalized bit counting is described. The method comprising incrementing a bit counter using a first clock, and adjusting a target bit based on a difference in frequency between the first clock and a second clock. The method further comprising determining when the bit counter reaches the adjusted target bit.

19 Claims, 5 Drawing Sheets

Fig. 5

METHOD AND APPARATUS FOR USING A FREQUENCY DIFFERENCE TO ADJUST A TARGET BIT FOR BIT COUNTING

FIELD OF THE INVENTION

The present invention relates to compact disk writing technology, and more specifically, to timing of a write-restart using bit counting.

BACKGROUND

A compact disk recorder writes data to a disc by using its laser to physically burn pits into the organic dye of the disc. When heated beyond a critical temperature, the area 'burned' becomes opaque (or absorptive) through a chemical reaction to the heat and subsequently reflects less light than areas that have not been heated by the laser. A CD-R or CD-RW disc can generally be used in a normal CD player as if it were a normal CD.

By mid-1998 drives were capable of writing at quad-speed and reading at twelve-speed (denoted as '4×/12×') and were bundled with much improved CD mastering software. The faster the writing speed the more susceptible a CD writer is to buffer underruns—the most serious of all CD recording errors. A buffer underrun occurs when the system cannot keep up a steady stream of data as required by CD recording. The CD recorder has a buffer to protect against interruptions and slowdowns, but if the interruption is so long that the recorder's buffer is completely emptied, a buffer underrun occurs, writing halts, and most often the recordable CD is irretrievably damaged.

One prior art solution to this problem is to use multi-session CD-ROM drives. On multi-session CD-ROMs, while it is impossible to erase data—once a location on the CD-R disc has been written to, the color change is permanent—there may be multiple write sessions to different areas of the disc. This permits the recording to stop and restart. However, only multi-session compatible CD-ROM drives can read subsequent sessions; anything recorded after the first session will be invisible to older drives. This is disadvantageous, as it is not compatible with the millions of currently available drives.

A new solution to this problem is to use link-less restarting. This permits restarting without the linking area required by multi-session drives. Timing the location of the restart is difficult. Generally, in link-less restart, a particular starting location is identified, and bit counting is used to reach the starting location.

One issue with restarting a session is that the bit counting may be problematic. In the prior art, a 33.8688 MHz crystal is used to generate the Eight-to-Fourteen clock (EFCK) signal (Eight-to-Fourteen Modulation (EFM) Bit Clock) in CLV (constant linear velocity) mode. The EFCK signal is then used to control the write gate FWGATE) on timing in the restart frame once ESFS (Encode Subcode Frame Sync) is synchronized with SCOR (Subcode Ready Sync) for the target frame. Because there are variations on the spindle motor speed during different read and write processes, counting to the restart bit using a fixed clock EFCK signal causes inconsistency on the WGATE on timing.

SUMMARY OF THE INVENTION

A method and apparatus for normalized bit counting is described. The method comprising incrementing a bit counter using a first clock, and adjusting a target bit based on a difference in frequency between the first clock and a second clock. The method further comprises determining when the bit counter reaches the adjusted target bit.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for normalized bit counting is described. For CD-R and/or CD-RW write under the traditional CLV method, as buffer underflow condition occurs during write process, firmware will stop the writing process. When the buffer underrun has been resolved, the writing is restarted. The write restart uses a bit counting algorithm to count to the target bit (the starting point), at which point the write gate is turned on, and writing is resumed.

Due to the variation in the spindle motor speed among the different read and write processes, the fixed EFCK signal cannot be used to accurately determine the starting point. The decoder clock (PLCK signal) from the CD-DSP would be more accurate to use to count the bits during read back. The present design utilizes the accuracy of the PLCK signal, while minimizing the changes to the existing hardware.

When the target frame is reached, the bits to get to the position (target bit) in order to resume the write process are counted. While the EFCK signal is used for bit counting, the relative frequency between the EFCK signal and the PLCK signals is compared. As long as the two clocks are at the same frequency, the target bit is found when the EFCK signal count reaches the restart target bit inside the target EFM frame. If, however, the EFCK signal and PLCK signal are not at the same frequency, then the number of PLCK signal edges that is more than the EFCK signal edges will cause the target bit to be smaller by the same number. In the case when the EFCK signal is faster than the PLCK signal, the target bit will become larger by the number of EFCK signals that are more than the PLCK signals during this bit-counting process. Thus, the target bit count is dynamically adjusted based on the discrepancy between the EFCK signal and the PLCK signal. When this dynamically adjusted target bit value matches the bit count, the target bit is considered found.

Figure 1:
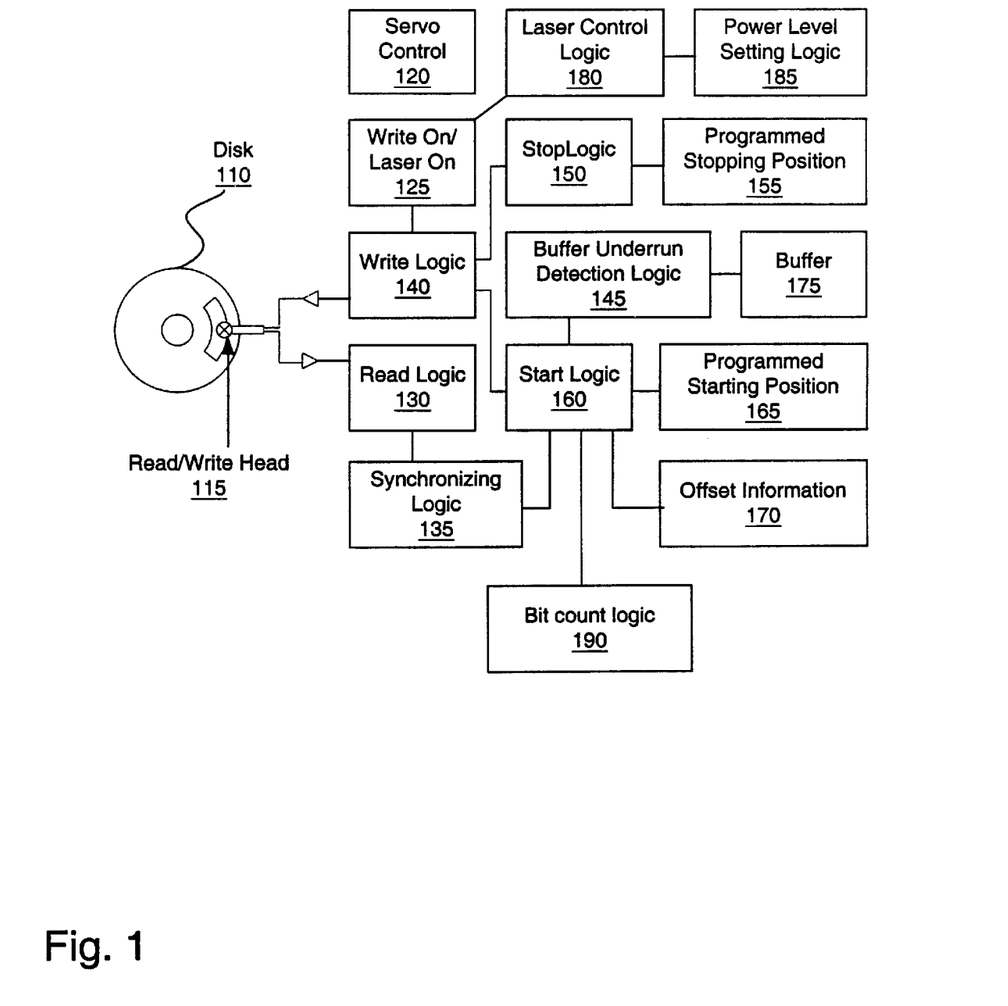
FIG. 1 is a system level block diagram of one embodiment of a compact disc recording system.

FIG. 1 is a system level block diagram of one embodiment of a compact disc recording system. The disk 110 is a CD-R disk, which permits reading and writing to the disk. A read/write head 115 is positioned over the disk 110. The read/write head is designed to read from and write to the disk 110. For one embodiment, the read/write head 115 may be two devices, one designed to read, and one designed to write. The read/write head includes a laser for writing to the disk 110, as is known in the art. The recording laser (not shown) is controlled by write on/laser on logic 125, which turns on the writing laser at a certain time, as will be discussed in more detail below.

Servo control 120 controls the mechanical aspects of the movement of the disk 110 and read/write head 115, as is known in the art.

Write logic 140 writes data to disk 110. Write logic 140 receives data from small buffer (not shown), and after encoding the data, writes the data to disk 110. Write logic 140 is controlled by start logic 160 and stop logic 150. Start logic 160 controls when write logic 140 starts to write, while stop logic 150 controls when write logic 140 stops writing.

Buffer underrun detection logic 145 detects when large buffer 175 is running low on data. Generally, buffer 175 is continuously filled. When the buffer underrun, the buffer underrun detection logic 145 detects that buffer 175 is running low, and may have a buffer underrun, the buffer underrun detection logic 145 passes this information to the stop logic 150, indicating that the stop logic 150 should stop the recording. The stop logic 150 determines when to stop the recording based on the programmed stopping position 155, which is stored in a register. For one embodiment, stop logic 150 stops the recording in the small frame after the buffer underrun detection logic 145 indicates that there is going to be a buffer underrun, at the location indicated by the programmed stopping position.

At the appropriate time, the stop logic 150 indicates to the write logic 140 that writing should be stopped. At that time, the write on/laser on logic 125 turns off or deflects the writing laser.

At a later time, the buffer underrun detection logic 140 may determine that the buffer 175 is sufficiently full that that recording should be restarted, and notify start logic 160. For another embodiment, another signal may indicate that it is time to restart recording. For example, the user may indicate that it is time to restart recording.

Start logic 160 uses read logic 130 to derive a synchronization signal, to synchronize the about-to-be recorded data to the previously recorded data. The start logic 160 uses the synchronizing data from synchronizing logic 135 to start writing new data, using write logic 140.

Start logic 160 determines the starting location based on the programmed starting position 165 and the offset information 170. The offset information 170 compensates for the time between when an area is actually under the read/write head 115 and when the read logic 130 identifies the information, and the delay between the time the start logic 160 prompts the write logic 140 to start writing and when the read/write head 115 actually starts to write data to the disk. For one embodiment, the offset information 170 is programmed by the OEM (original equipment manufacturer) who indicates the distance between the read/write head 115 and the read logic 130, while the system determines the time for the read logic 130 to identify the information, and the time between the start logic 160 prompts the write logic 140 to start writing and when the read/write head 115 actually starts to write data to the disk. The resulting starting point includes a target frame and a target bit at which writing is to restart.

Bit count logic 190 is used to count the bits to the starting point. The bit count logic normalizes the bit count, to adjust for variations in spindle speed. This is described in more detail below.

When the starting point is reached, the start logic 160 prompts the write logic 140 to start writing. In this way, the system can stop writing data to disk 110, and restart writing data, at the pre-programmed starting point. FIG. 1 is an example of the structure in which the bit normalization logic of FIG. 2 may be included. However, bit normalization may be used for other systems and processes that need to obtain an accurate bit count when the original clock frequencies may have changed.

Figure 2:
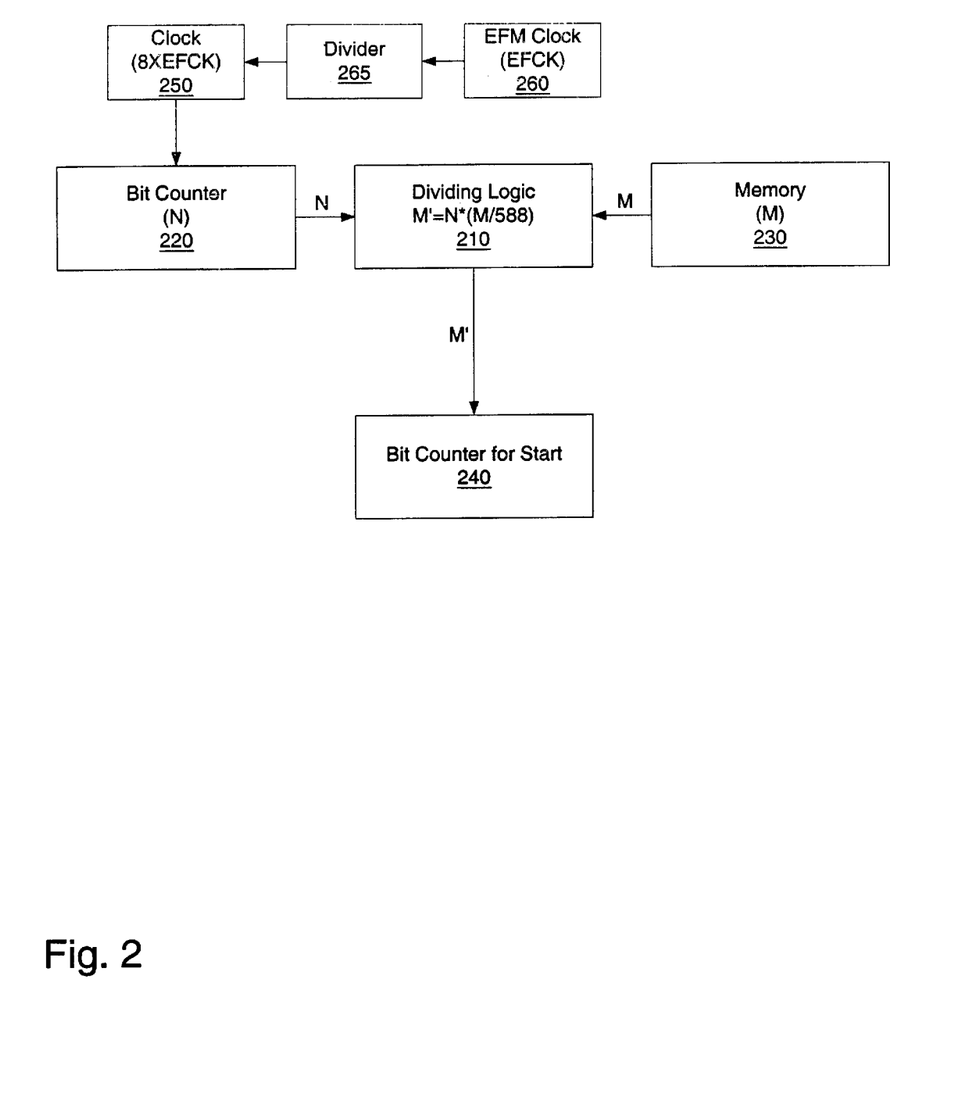
FIG. 2 is a block diagram of one embodiment of the bit count logic.

FIG. 2 is a block diagram of one embodiment of the bit count logic. The bit counter 210 has as an input the target bit data, which specifies the value to which the bit counter 210 counts. As discussed above, the target bit data may be a preprogrammed starting point. For another embodiment, the target bit data may be the bit at which writing stopped, i.e. the stop bit. For another embodiment, the target bit may be calculated based on the known stopping point. The bit counter 210 latches the target bit data. Then, the bit counter 210 uses the EFM clock (EFCK signal) to count bits until it reaches the target bit.

The bit count logic 190 further includes clock frequency error adjustment logic (CFEA) 220. The CFEA logic 220 receives as an input the EFM clock and the decoder clock (PLCK signal). The CFEA logic 220 determines if there is a discrepancy between the PLCK signal and the EFCK signal. If the PLCK signal and the EFCK signal are not at the same frequency, the CFEA logic 220 passes a target bit delta to the bit counter 210. The target bit delta adjusts the target bit data, up or down. If the frequency of the PLCK signal is higher than the frequency of the EFCK signal, the target bit value is reduced. If the frequency of the EFCK signal is higher than the frequency of the PLCK signal, then the target bit's value is increased. In this way, the effect of any discrepancy between the frequencies of the PLCK signal and the EFCK signal is reduced to the resolution of the PLCK and EFCK signals.

Figure 3:
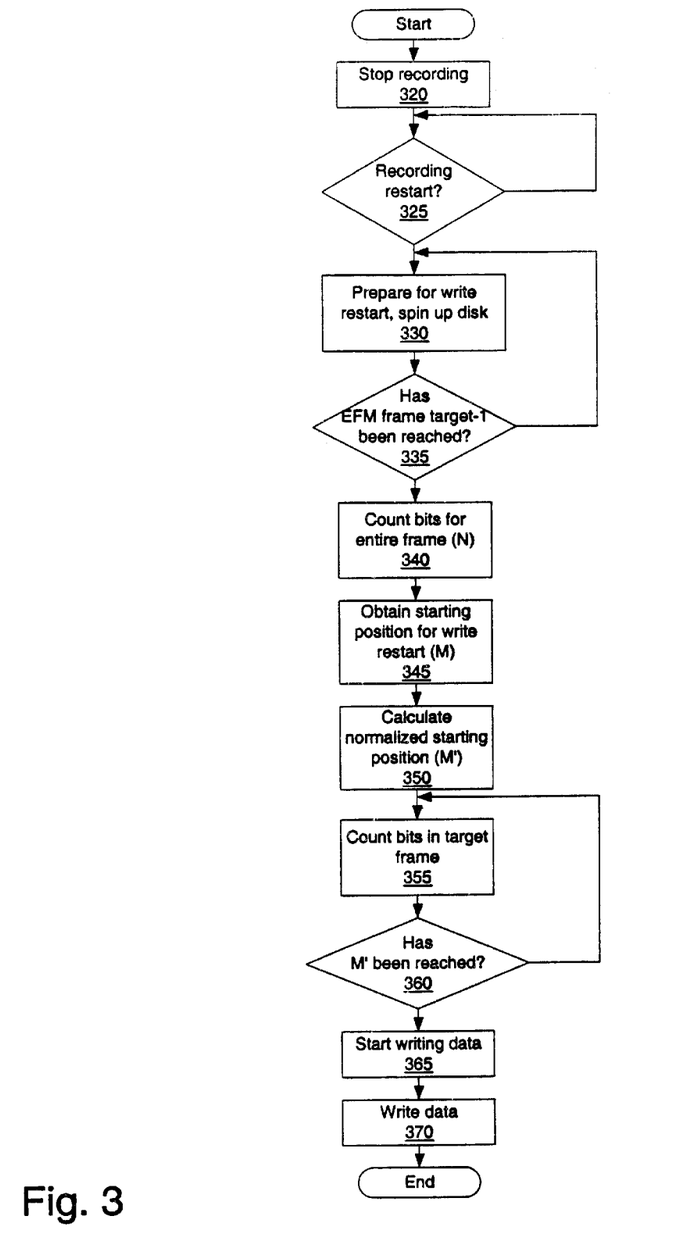
FIG. 3 is a circuit diagram of one embodiment of the frequency adjustment logic.

FIG. 3 is a circuit diagram of one embodiment of the frequency adjustment logic. The bit counter 310 has as an input the EFCK signal 355, which is used by the bit counter 310 as its clocking input. The CD encoder delay 375 is also input to the bit counter 310, to offset the starting point of the count. The CD encoder delay 375 is measured using EFCK signal 355, so it is a fixed delay and requires no dynamic adjustment during the bit-counting process. Finally, the EFM frame count is input to the bit counter 310.

The EFM frame counter 360 has as its clock input the EFM frame Sync (synchronization) signal 385, which indicates the start of an EFM frame. The reset bit is controlled by the target subcode frame signal 390. Thus, the EFM frame counter 360 is reset when the target subcode frame is encountered. The output of the EFM frame counter 360 is compared by comparator 365 to the frame portion of the target address 395. If the EFM frame counter 360 output matches the target EFM frame, the load signal (LD) is sent to bit counter 310.

The bit counter 310 then proceeds to count the bits, using the EFCK signal 355. The current bit count 315 is compared to the target bit 325 by comparator 330. If the current bit count 315 equals to target bit 325, a bit found signal is sent, and the write restart is initiated. Each of these elements is present in existing systems that do not account for frequency differences between the EFCK signal 355 and the PLCK signal 345. The additional elements are two edge detectors 340, 350 and a target bit adjustor 320.

The target bit adjustor 320 outputs the adjusted target bit 325, which is compared with the current bit count 315. The target bit adjustor 320 receives as one if its inputs a load signal, when the target EFM frame is reached. The load signal is received from comparator 365. Another input to the target bit adjustor 320 is the bit portion of the non-adjusted target address 395. For one embodiment, the target address 395 is based on the starting address minus a CD-DSP delay. Because the CD-DSP delay is measured by PLCK signal, it is also dynamically adjusted.

The target bit from the target address 395 is loaded into the target bit adjustor 320. From this starting point, the target bit is dynamically adjusted up or down by the target bit adjustor 320. The adjustment reflects the relative frequencies of the EFCK signal 355 and the PLCK signal 345.

The first edge detector 350 detects the positive edges of the EFCK signal 355. The edge detector 350, for one embodiment, is simply a latch that is triggered by a transition of the clock signal 370. The output of the edge detector 350 is input to the UP input of the target bit adjustor 320.

The second edge detector 340 detects the positive edges of the PLCK signal 345. The output of the edge detector 340 is input to the DOWN input of target bit adjustor 320.

Thus, each PLCK edge decrements the target bit by one, while each EFCK edge increments the target bit by one. Thus, if the EFCK signal is faster than the PLCK signal, the target bit will be incremented by the number of EFCK signal transitions that are greater than the PLCK signal transitions.

In this way, with only a few additional hardware elements any frequency discrepancies between the EFCK signal 355 and the PLCK signal 345 are accounted for.

Figure 4:
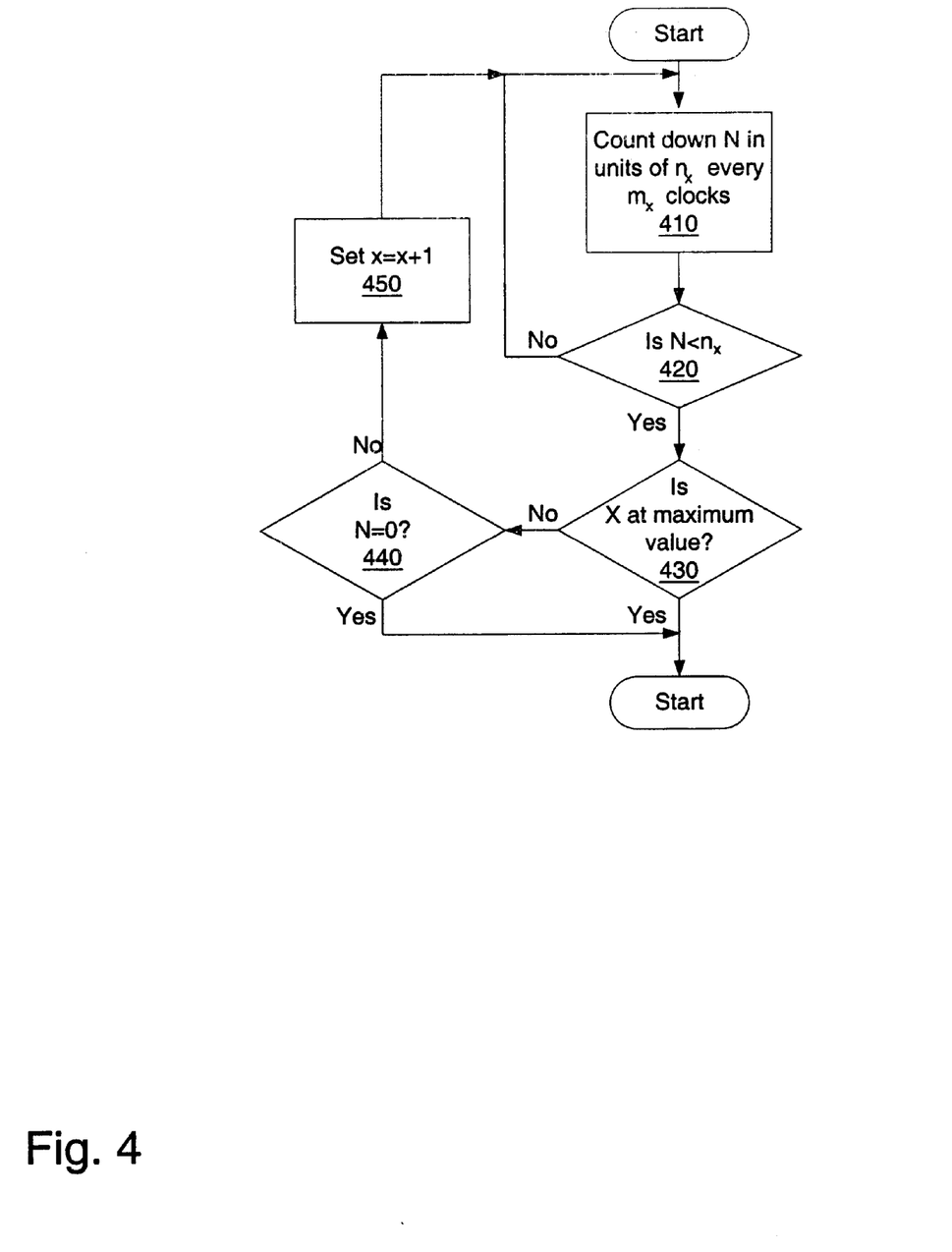
FIG. 4 is a flowchart of one embodiment of using the bit count logic with the frequency adjustment.

FIG. 4 is a flowchart of one embodiment of using the bit count logic with the frequency adjustment. The process starts when the system is writing data to a disk.

At block 420, the process stops recording. As discussed in copending application Serial No. 09/953,653, this may be a reaction to a prospective buffer underrun. However, recording may stop as a result of other factors, such as shock or other track loss situations.

At block 425, the process determines whether writing has been restarted. Writing may be restarted, in a buffer underrun situation, when the buffer is refilled. In other situations, when the problem is remedied, the writing may restart. For one embodiment, a user proactively restarts recording. Although this is shown as a decision loop, it is in fact input driven. Thus, the process is not activated until the write restart process has been initiated.

At block 430, the disk is spun up, and other write restart mechanisms take place. The steps needed to start recording are known in the art.

At block 435, the process determines whether the target EFM frame has been reached. If so, the process continues to block 440. Otherwise, the process returns to block 435 to continue the restart process.

At block 440, the starting position for the write restart is obtained. The starting position, or target bit, is designated M. As discussed above, the value M may be preprogrammed, equal to the stopping point, or derived through some other calculations. At block 445, the target bit is loaded into the target bit adjustor 320. Note that the processes shown in blocks 440 and 445 may occur at any time, prior to the start of the counting process.

At block 450, the value of M is decremented for each PLCK transition encountered, and incremented for each EFCK transition encountered. This adjusted value of M is designated M'. This adjustment would generally vary the value of M' by only a few bits.

At block 455, the bits are counted using the EFM clock. As discussed above, the bit counter continues to count bits using the EFCK.

At block 460, the process determines whether M', the adjusted target bit, has been reached. If it has not yet been reached, the process continues to block 450, where it continues to adjust M' and count bits. Note that although this is shown as a flowchart, each of these processes occur concurrently. Thus, while the bit counter is counting bits, the target bit adjustor is incrementing and decrementing the target bit, and there is a continuous comparison between the adjusted target bit and the current count.

If the adjusted target bit, M', has been reached, the process continues to block 465. At block 465, writing is restarted. Writing continues at block 470. The process then ends. Note that this process may be run numerous times during a single recording session.

Figure 5:
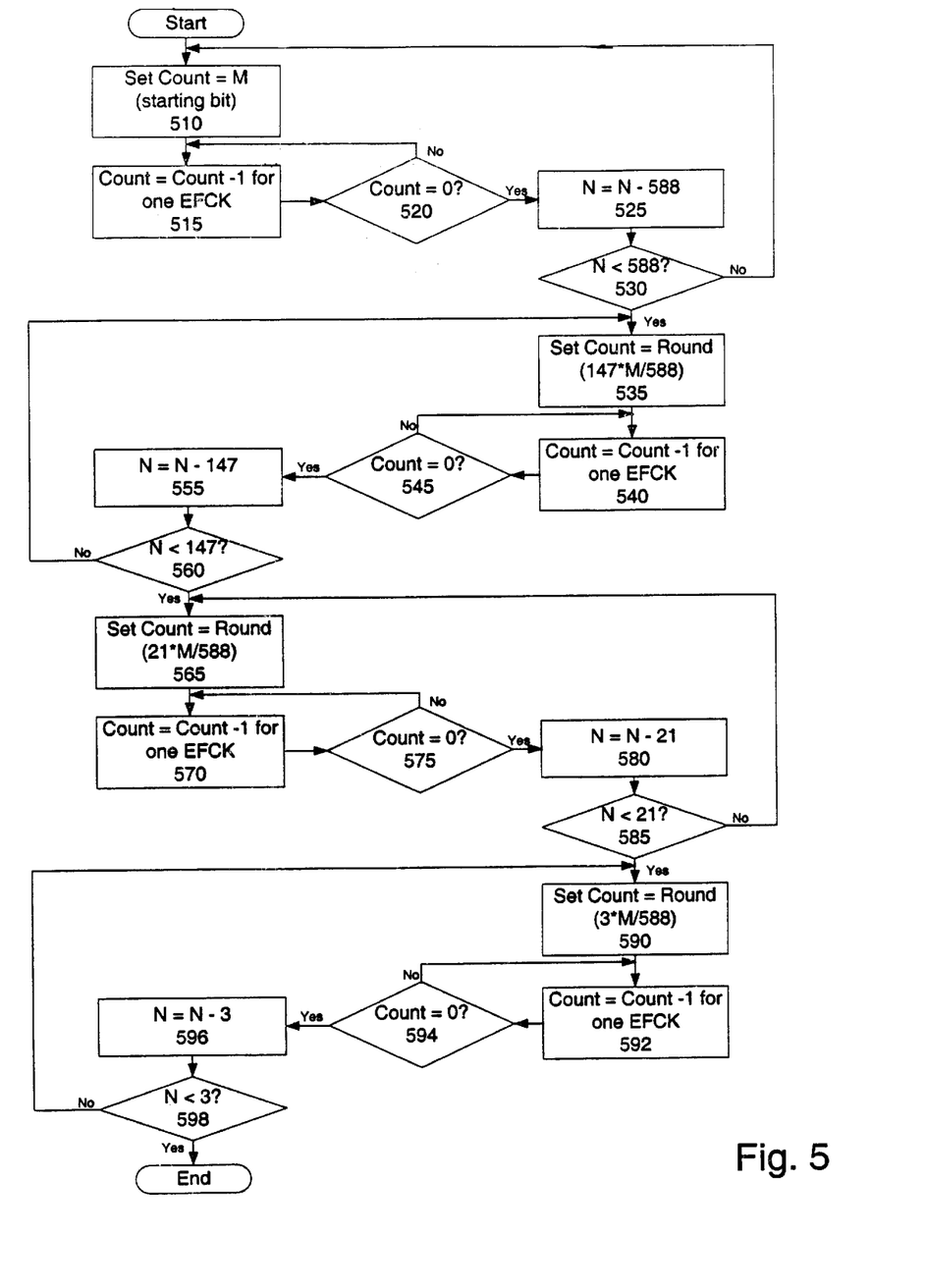
FIG. 5 is a flowchart of one embodiment of the detail of frequency adjustment.

FIG. 5 is a flowchart of one embodiment of the detail of frequency adjustment. The process starts at block 510, when the write restart has been initiated. The bit counter is started when the target EFM frame is reached, at block 510.

At block 515, the target bit count is loaded into the adjustor logic.

At block 520, the process determines whether the EFM clock signal edge has been encountered. If so, the process continues to block 525. At block 525, the bit count is incremented by one, and the target bit is incremented by one. The process then continues to block 545.

At block 545, the process determines whether the target bit has been reached by the bit counter. If not, the process returns to block 520, to continue counting clock transitions. Otherwise, the process ends, having found the appropriate starting point.

If, at block 520, there is no EFM clock signal edge, the process continues to block 535. At block 535, the process determines whether the decoder clock signal (PLCK) clock edge has been detected. If so, the process continues to block 540. At block 540, the target bit is decremented by one. The process then continues to block 545, to determine whether the target bit has been reached by the bit counter. If the PLCK clock edge has not been detected, the process continues directly to block 545, to determine whether the target bit has been reached.

Thus, the process is as follows. The bit counter is initially at zero, while the target bit is at M. When the first EFM signal edge is encountered, the bit counter is incremented to 1, while the target bit becomes M+1. When the PLCK signal edge is encountered, the bit counter remains at 1, while the target bit becomes M. On encountering the second EFM signal edge, again the bit counter is incremented, to 2, while the target bit becomes M+1. When the PLCK is detected, the target bit becomes M once again. Thus, as can be seen, if the PLCK signal and the EFCK signal have the same frequency, the target bit remains at value M, being incremented and decremented at the same rate, while the bit count rises. However, if one or the other clock signal is faster, the target bit is continually adjusted to account for the difference between the clock frequencies. In this way, without requiring significant additional hardware or reconstruction of existing hardware, the bit count can be normalized to account for differences in spindle speed between the initial writing period and the write-restart.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to linklessly restart writing to a disk, comprising:

incrementing a bit counter using a first clock;

adjusting a target bit based on a difference in frequency between the first clock and a second clock; and determining when the bit counter reaches the adjusted target bit;

determining a starting location using the bit counter to generate a target bit count for restart, the adjusted bit counting used to compensate for a difference in a spindle motor speed of a compact disk writing system upon write restart, by being incremented and decremented based on the difference in the speed.

2. The method of claim 1, wherein adjusting the target bit comprises:

incrementing a target bit using the first clock; and decrementing the target bit using a second clock.

3. The method of claim 2, wherein the incrementing and decrementing occur at a clock edge transition of the first clock or the second clock.

4. The method of claim 3, wherein the incrementing and the decrementing occurs at positive clock edges of the first clock and the second clock.

5. The method of claim 1, wherein the first clock is an Eight-to-Fourteen Modulation (EFM) clock and the second clock is a decoder clock in a compact disk writing system.

6. A method of adjusting a bit count for identifying a target bit for write-restart in an optical disk writing system, the method comprising:

incrementing a bit counter using a first clock;

incrementing a target bit using the first clock, the target bit identifying a starting location for write restart; and decrementing the target bit using a second clock;

wherein a frequency difference between the first clock and the second clock is compensated for by the adjusting of the target bit;

determining a starting location using a normalized bit counter to generate a target bit count for restart, the normalized bit counter to compensate for a difference in the speed of a spindle motor by being incremented or decremented based on the difference in the speed.

7. The method of claim 6, wherein the frequency difference between the first clock and the second clock is a result of a difference in a spindle speed of a compact disk writing system upon write restart.

8. The method of claim 7, wherein the first clock is an Eight-to-Fourteen Modulation (EFM) clock and the second clock is a decoder clock in the compact disk writing system.

9. An apparatus to adjust a bit count for writing to a compact disk comprising:

a bit counter to count transitions of a first clock and determine whether a current count equals a target count; and a clock frequency error adjustment logic to adjust the target count based on a difference in frequency between the first clock and a second clock, wherein the second clock is a more accurate clock; and a comparator to detect when the target count is reached; and a start logic to linklessly re-start writing to the disk, the start logic further to determine a starting location using the bit counter to generate the target bit count for restart, the bit counter to compensate for a difference in the speed of a spindle motor by being incremented or decremented based on the difference in the speed.

10. The apparatus of claim 9, wherein the clock frequency error adjustment logic comprises:

a target bit adjustor to adjust the target bit based on a difference in clock transitions of the first clock and the second clock; and a comparator to compare the adjusted target bit with a current bit count from the bit counter.

11. The apparatus of claim 10, further comprising:

a first edge detector to detect a clock edge of the first clock;

a second edge detector to detect a clock edge of the second clock; and the target bit adjustor to increment the target bit for every clock edge of the first clock, and further to decrement the target bit for every clock edge of the second clock.

12. The apparatus of claim 10, further comprising:

an Eight-to-Fourteen Modulation (EFM) frame counter to detect a target EFM frame, and to trigger the bit counter and the target bit adjustor in response to detecting the target EFM frame.

13. The apparatus of claim 10, wherein the first clock is an EFM frame clock and the second clock is a decoder clock.

14. A compact disk write-restart system comprising:

a spindle motor to spin a compact disk for reading and writing;

a write logic to write data to the compact disk;

a stop logic to stop writing to the compact disk; and a start logic to linklessly re-start writing to the disk, the start logic further to determine a starting location using a normalized bit counter to generate a target bit count for restart, the normalized bit counter to compensate for a difference in the speed of a spindle motor by being incremented or decremented based on the difference in the speed.

15. The compact disk write-restart system of claim 14, wherein the normalized bit counter comprises:

a bit counter to count transitions of a first clock and determine whether a current count equals a target count; and a clock frequency error adjustment logic to adjust the target count based on a difference in frequency between the first clock and a second clock, wherein the second clock is a more accurate clock.

16. The compact disk write-restart system of claim 15, wherein the clock frequency error adjustment logic comprises:

a target bit adjustor to adjust the target bit based on a difference in clock transitions of the first clock and the second clock; and a comparator to compare the adjusted target bit with a current bit count from the bit counter.

17. The compact disk write-restart system of claim 16, further comprising:

a first edge detector to detect a clock edge of the first clock;

a second edge detector to detect a clock edge of the second clock; and the target bit adjustor to increment the target bit for every clock edge of the first clock, and further to decrement the target bit for every clock edge of the second clock.

18. The compact disk write-restart system of claim 16, further comprising:

an Eight-to-Fourteen Modulation (EFM) frame counter to detect a target EFM frame, and to trigger the bit counter and the target bit adjustor in response to detecting the target EFM frame.

19. The apparatus of claim 14, wherein the first clock is an Eight-to-Fourteen Modulation (EFM) frame clock and the second clock is a decoder clock.

* * * * *